March 2, 1926.
W. H. HUNGERFORD
BISCUIT HANDLING MACHINE
Filed Dec. 3, 1923
1,575,207
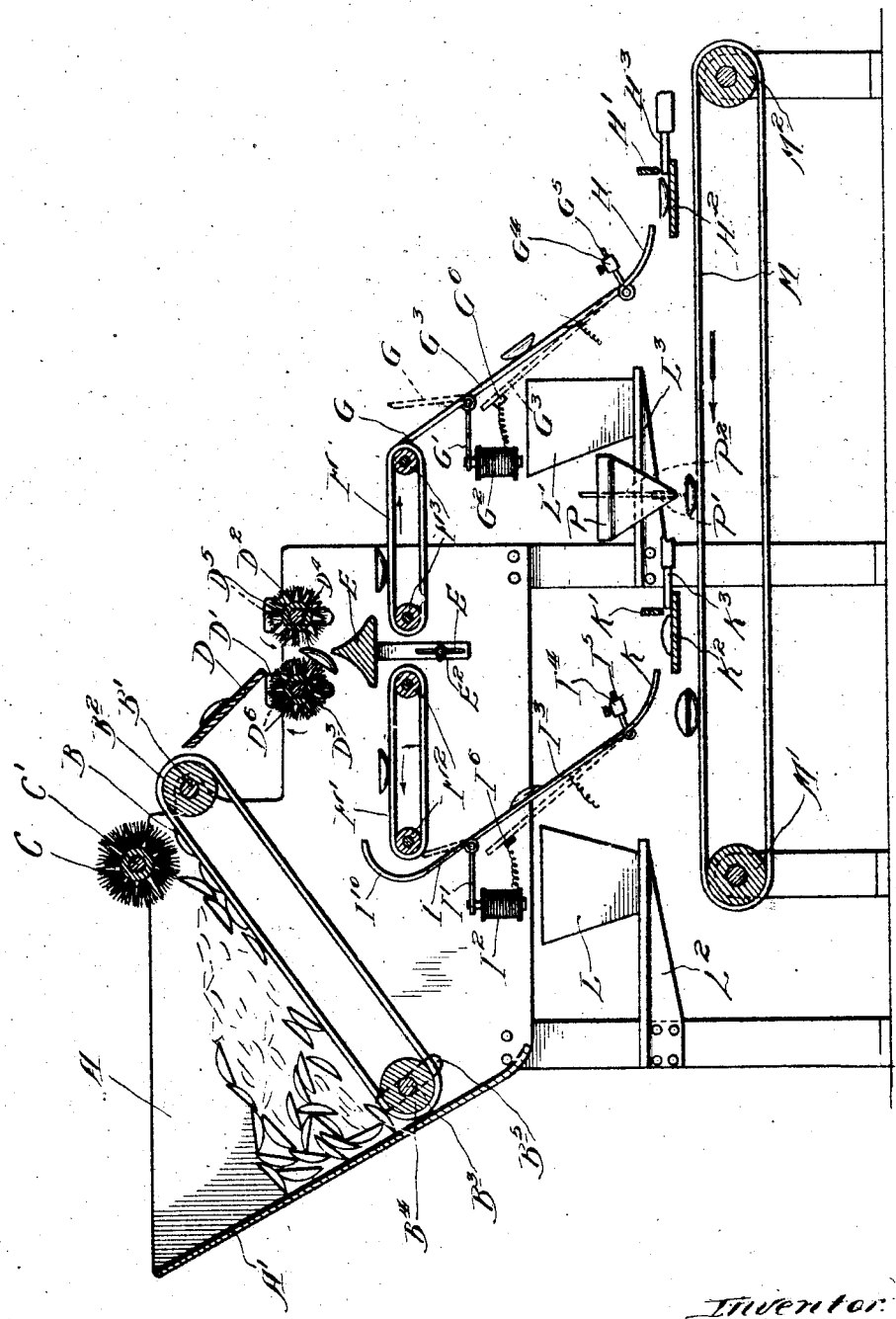
Inventor:
Warren H. Hungerford,
by Parker & Carter
Attys Patented Mar. 2, 1926.

1,575,207

UNITED STATES PATENT OFFICE.

WARREN H. HUNGERFORD, OF CHICAGO, ILLINOIS.

BISCUIT-HANDLING MACHINE.

Application filed December 3, 1923. Serial No. 678,091.

*To all whom it may concern:*

Be it known that I, WARREN H. HUNGERFORD, a citizen of the United States, residing at Chicago, in the county of Cook and State of Illinois, have invented a certain new and useful Improvement in Biscuit-Handling Machines, of which the following is a specification.

My invention relates to a biscuit sorting device. It has for one object to provide a device whereby biscuits or similar objects may be sorted or faced in such manner that the like sides of each biscuit will face in the same direction in any given series of biscuits or such like articles. Another object is to provide a sorting or facing machine adapted for use with a biscuit handling mechanism wherein it is desired to feed a series of biscuits faced in one direction and another series of biscuits faced in the opposite direction. Another object is to provide a biscuit facing or sorting device for use with biscuit icing machines. Another object is to provide a biscuit facing or sorting device particularly adapted for use with machines for making iced sandwiches wherein each sandwich is formed of a pair of biscuits with flat sides together and rounded sides out with a layer of icing between the biscuits and bonding them. Other objects will appear from time to time in the course of the specification and claims.

I illustrate my invention more or less diagrammatically in the accompanying drawing which represents a vertical longitudinal section through my device.

Like parts are illustrated by like symbols throughout the description and drawings.

A is any suitable hopper having the end wall $A^1$. The bottom of the hopper is shown as formed by the belt B which is driven from the drive shaft $B^1$ and the pulley $B^2$, the power source for which is not herein shown. $B^3$ is a pulley shaft and $B^4$ a pulley at the opposite end of the belt, the shaft and pulley being shown as adjustable along the slot $B^5$ to vary the inclination of the belt B.

C is a brush mounted upon the brush shaft $C^1$ driven in opposition to the direction of travel of the belt.

D is a conveyor, herein shown as a fixed slide, which is adapted to receive cookies deliveered by the belt and to drop them between the opposed brushes $D^1$, $D^2$, which are rotated in opposition to each other, in the direction shown by the arrows, through the drive shafts $D^3$, $D^4$ from a power source not herein shown. The brushes are vertically adjustable, as for example along the slots $D^5$, $D^6$. These brushes, which serve to face the cookies, are not claimed herein, being covered in my co-pending application No. 671,327, filed on the 29th day of October, 1923.

E is a vertically adjustable double faced deflector and $E^1$ is the adjusting slot and $E^2$ is a securing set screw. The opposed brushes $D^1$, $D^2$ as they rotate press between them the biscuits which pass through. If the opposed sides of the biscuit are flat and parallel, the biscuit will drop straight, but if one side is plane and the other curved, as in the type of biscuit shown herein, the biscuit will be tilted by the action of the brushes, since it will tend to take that position which will permit the opposed brush bristles to approach each other more closely. In practice the cookie or other object will be tilted to the position of the cookie grasped between the brushes, as shown in the drawing. In that position its lower edge will be carried to the left of the deflector E and the cookie will be deposited with its rounded side down on the below described conveying belt $F^1$. If the cookie shown were turned in the opposite direction, namely with the flat side to the right, it would have been tilted or turned in the opposite direction and would have been deposited rounded face down upon the conveying belt F.

F, $F^1$ are conveying belts driven about the pulleys $F^2$, $F^2$, $F^3$, $F^3$ in the direction shown by the arrows.

G is a pivoted slide element positioned adjacent the outer end of the belt F and provided with a bell crank lever $G^1$ in connection with the solenoid $G^2$. $G^3$ is a second pivoted slide section contacting the lower end of the slide section G and normally kept in the position shown in full lines by means of the adjustable counter weight $G^4$ which may be adjusted along the lever $G^5$. $G^6$ is an electric contact adapted to actuate the solenoid $G^2$ when the pivoted slide $G^3$ is in the position shown in the dotted lines.

H is a fixed terminal slide section adapted to receive the biscuits delivered along the slide sections G, $G^3$. $H^1$ is a stop adapted to check the travel of the biscuits and to drop them upon the fixed slide H². H³ is any suitable conveyor or plunger element adapted to be reciprocated across the upper surface of the slide H² to carry the biscuits therefrom and, for example, to deposit them on the belt M.

I¹⁰ is a reversing guard or slide adjacent the outer end of the belt F¹. I is a slide element similar to the element G, with the bell crank lever I¹ and the solenoid I². I³ is a pivoted slide element similar to the element G³ and provided with the counter weight I⁴ adjustable along the lever I⁵. I⁶ is an electric terminal or connection which is adapted, when contacted by the slide I³, to actuate the solenoid I².

K is a bottom slide section similar to H and is similarly associated with a stop K¹, a fixed slide K² and a reciprocating element K³.

L, L¹ are receptacles suitably positioned beneath the slide sections G and I, mounted, for example, on the frame brackets L², L³. P is any suitable hopper or spout positioned above the belt M intermediate the slides H² and K². Mounted within it is a cylinder P¹ and adapted to reciprocate in it is a plunger and piston P² which may be actuated by any suitable driving means in such fashion that it is lifted at each stroke above the top of the cylinder to permit the entry into the cylinder of the icing, marshmallow filling or other substance which is to be delivered to the biscuit passing therebeneath.

M is a belt adapted to be driven in the direction shown in the arrow, about the pulleys or rollers M¹, M² by any suitable power source not herein shown.

It will be realized that while I have shown an operative device, many changes might be made in the size, shape, proportion, relation and disposition of parts without departing from the spirit of my invention, and I therefore wish my description and drawings to be taken as in a large sense diagrammatic.

The use and operation of my invention are as follows:

I have illustrated a biscuit feeding and sorting means which comprises a biscuit containing hopper into which biscuits may be fed by hand or in any other suitable way. The hopper contains an inclined belt which carries the biscuits upwardly against a brush which is rotated in opposition to the direction of movement of the belt. By controlling the speed of brush and belt, and the inclination of the belt, it is possible to control the volume of biscuits fed. The brush C also serves to prevent the passage of superposed pairs of biscuits to the slide D and the facing brushes. The passage of such pairs of biscuits simultaneously through the brushes would prevent proper facing although of course, a number of biscuits can be simultaneously faced if they are axially spaced along the brushes. The biscuits are fed to the slide D and thence dropped between the facing or sorting brushes. These brushes, and the deflector or guide E, deliver the biscuits rounded side down upon the conveyor belts F, F¹. Those which wall upon the conveyor belt F are delivered thereby to the slide elements G, G³ and H, over which they pass to the fixed plate H². From this plate the biscuits which are successively deposited thereupon after their descent down the slide are removed, for example by the plunger H³ which reciprocates back and forth across the upper surface of the plate. They may thus be fed to any suitable biscuit handling device and may be carried thence to or through any suitable type of icer. I have shown, however, an endless belt M which passes beneath an icing or marshmallow delivering hopper or nozzle P. The belt M is preferably, though not necessarily, given a step by step movement and the reciprocation of the element H³ is in such case timed to deliver a biscuit to the belt M at each step of the movement of the belt. The series of biscuits thus delivered to the top of the belt M is carried beneath the icing spout L¹ and receives a coat of icing on its upwardly turned flat side.

Meanwhile the biscuits delivered to the belt F¹ are reversed by the reversing slide element I¹⁰ and pass flat side down over the slide elements I, I³ and K to the fixed slide K². Thence they are projected by the reciprocating element K³ and are delivered, for example, to the top of the belt M. The slides K², H² and the icing spout L⁴ may be so spaced and the step by step movement of the belt M and the reciprocation of the arms H³ and K³ may be so timed that as each iced biscuit passes beneath and beyond the plate K² it receives a biscuit upon it flat side down, delivered by the element K³.

However, since the feed of biscuits from the belts F and F¹ may not be equal, I provide a control for the feed of biscuits to the fixed plates K² and H² and to prevent the accumulation of biscuits on said plates which would interfere with the timed delivery of biscuits therefrom. I put in each slide a pivoted slide section, in the one case G³ and in the other I³, which are normally kept, by the adjusting weights G⁴ and I⁴, in the position shown in the full lines. When an excess of biscuits is fed to either slide, it drops in response to their weight against the terminal G⁶ or I⁶, and actuates the solenoid G² or I², which is adapted to raise the bell crank lever G¹ or I¹ respectively. During this interruption to the feed, the biscuits are fed through the break or breaks thus formed, and are received in the receptacles L, L¹. Thence they may be periodically removed and reinserted into the hopper A. The weight of the bell crank lever I¹ or G¹ is sufficient to hold the slide element G or I normally in the position shown in the full lines.

While I have described and shown my sorting device as used for making biscuit sandwiches, it is obvious that it is equally applicable to the production of iced biscuits or of biscuits covered with marshmallow or any other surfacing or covering. In such case I simply interrupt the feed of one or the other of the slides and feed the single biscuits in a series past or beneath whatever icing or other biscuit treating means are in use at the time.

I claim:

1. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, means for reversing the facing of all of the biscuits of one of said series only.

2. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, means for reversing the facing of all of the biscuits of one of said series and means for bringing said biscuit series together and for superposing upon the biscuits of one of said series bircuits from the other of said series.

3. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, means for reversing the facing of all of the biscuits of one of said series, a biscuit coating element, and means for subjecting the biscuits of one of said series successively to its action.

4. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, means for reversing the facing of all of the biscuits of one of said series, a biscuit coating element, and means for subjecting the biscuits of one of said series successively to its action, and means for superposing upon the biscuits so treated biscuits from the other series.

5. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, means for reversing the facing of all of the biscuits of one of said series, a conveyor and a biscuit coating element located therealong, means for successively depositing the biscuits of one of said series upon the conveyor, means for actuating said conveyor to carry said biscuits successively past the coating element and means for superposing upon the biscuits so coated biscuits from the other series.

6. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, means for reversing the facing of all of the biscuits of one of said series, a biscuit coating element, and means for subjecting the biscuits of said series successively to its action.

7. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, and separate means for limiting the passage of biscuits along each of said paths.

8. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, means for reversing the facing of all of the biscuits of one only of said series, and separate means for limiting the passage of biscuits along each of said paths.

9. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, and separate means for limiting the passage of biscuits along each of said paths.

10. In a biscuit handling device, a biscuit feeding means, a biscuit facing means adapted to deliver a series of biscuits each with the same side facing up, means for dividing the biscuits delivered by said facing means into a plurality of series, means for conveying said series along separate paths, means for reversing the facing of all of the biscuits of one only of said series, and separate means for limiting the passage of biscuits along each of said paths.

11. In a biscuit handling device, a biscuit feeding means, a biscuit facing means adapted to deliver a series of biscuits each with the same side facing up, a plurality of conveyors, each conveyor adapted to receive and separately convey a portion of the biscuits delivered by said facing means, a reversing element adapted to reverse the facing of the biscuits carried by one only of said conveyors.

12. In a biscuit handling device, a biscuit feeding means, a biscuit facing means adapted to deliver a series of biscuits each with the same side facing up, a plurality of conveyors, each conveyor adapted to receive and separately convey a portion of the biscuits delivered by said facing means, and means for limiting the delivery of biscuits conveyed by each of said conveyors, comprising a cut-off element and means for actuating it in response to a predetermined load of biscuits upon said conveyor.

13. In a biscuit handling device, a biscuit feeding means, a biscuit facing means adapted to deliver a series of biscuits each with the same side facing up, a plurality of conveyors, each conveyor adapted to receive and separately convey a portion of the biscuits delivered by said facing means, and means for limiting the delivery of biscuits conveyed by each of said conveyors, comprising a cut-off element and means for actuating it comprising a movable section in said conveyor, a solenoid and an electric contact therefor adapted to be contacted by said movable section in response to a pre-determined load of biscuits thereupon.

14. In a biscuit handling device, a biscuit feeding means, a biscuit facing means adapted to deliver a series of biscuits each with the same side facing up, a plurality of conveyors, each conveyor adapted to receive and separately convey a portion of the biscuits delivered by said facing means, and means for limiting the delivery of biscuits conveyed by each of said conveyors, comprising a cut-off element and means for actuating it comprising a movable section in said conveyor, a solenoid and an electric contact therefor adapted to be contacted by said movable section in response to a pre-determined load of biscuits thereupon, and means for normally maintaining said movable section out of contact with said contact.

15. In a biscuit handling device, a biscuit feeding means, a biscuit facing means adapted to deliver a series of biscuits each with the same side facing up, a plurality of conveyors, each conveyor adapted to receive and separately convey a portion of the biscuits delivered by said facing means, and means for limiting the delivery of biscuits conveyed by each of said conveyors, comprising a cut-off element and means for actuating it comprising a movable section in said conveyor, a solenoid and an electric contact therefor adapted to be contacted by said movable section in response to a pre-determined load of biscuits thereupon, and means for normally maintaining said movable section out of contact with said contact comprising a lever and a weight adjustable therealong.

Signed at Chicago, county of Cook and State of Illinois, this 28 day of Nov., 1923.

WARREN H. HUNGERFORD.